United States Patent Office 3,075,725
Patented Jan. 29, 1963

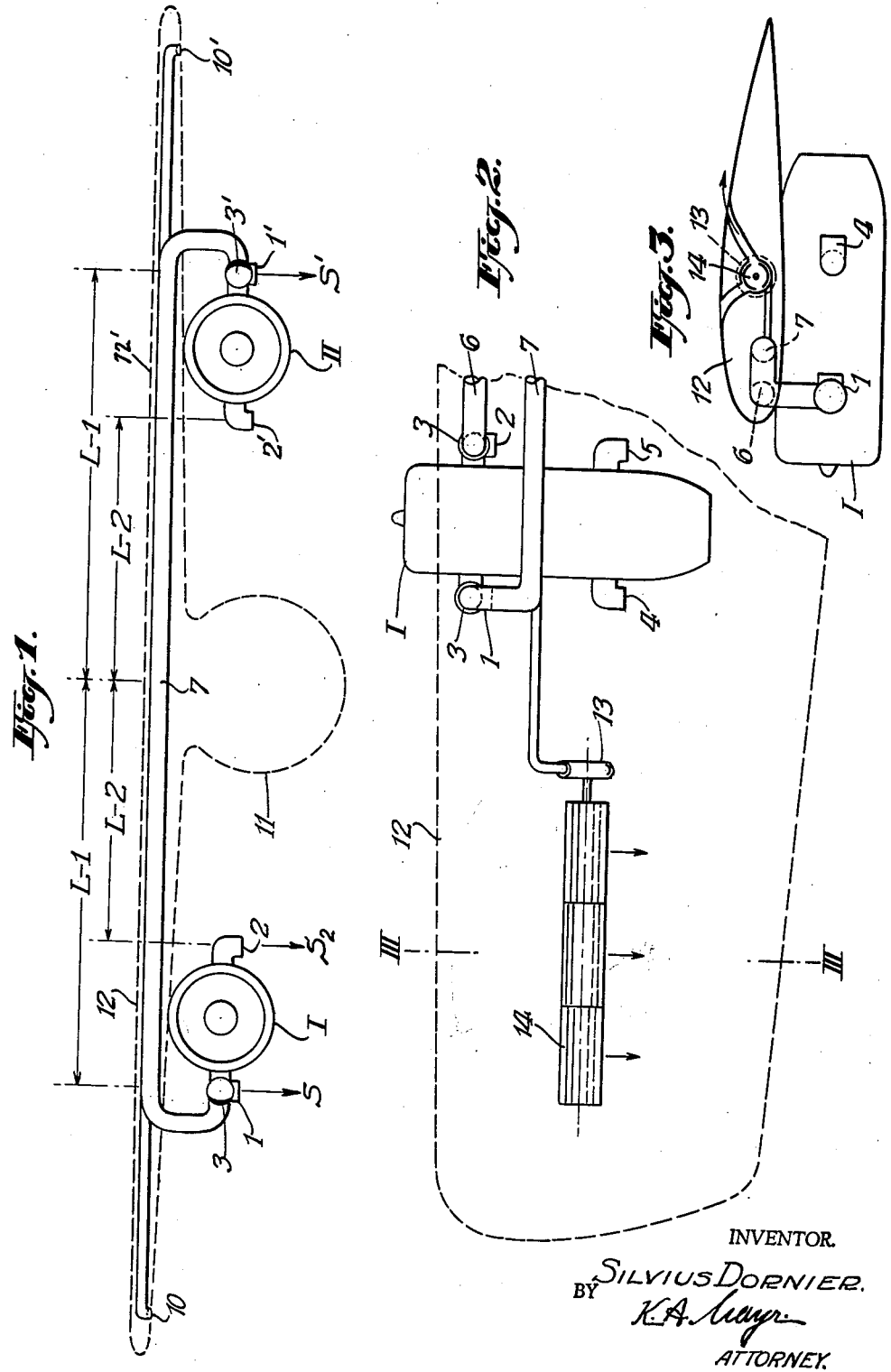

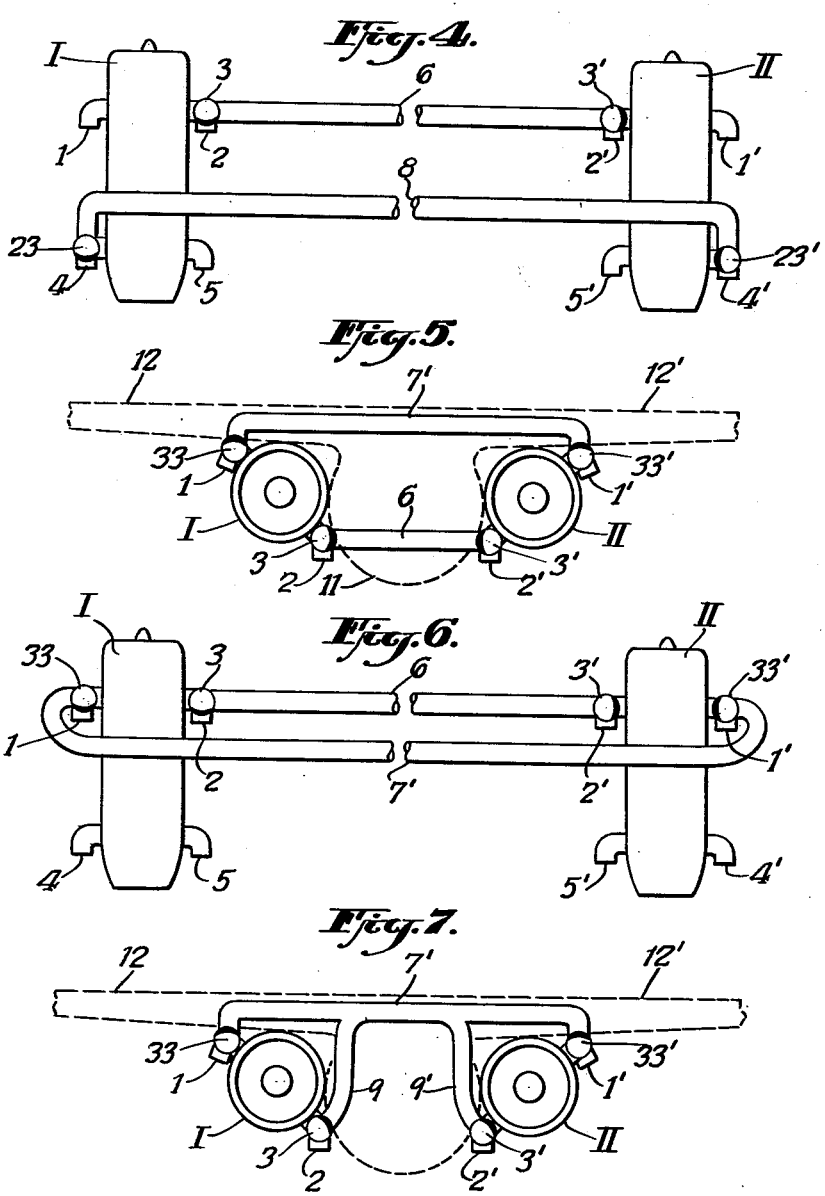

3,075,725
AIRCRAFT HAVING TWO OR MORE JET POWER UNITS PLACED SYMMETRICALLY TO THE CENTRAL AXIS
Silvius Dornier, Friedrichshafen, Germany, assignor to Dornier-Werke G.m.b.H., Friedrichshafen, Germany, a firm of Germany
Filed Feb. 20, 1962, Ser. No. 174,507
Claims priority, application Germany Feb. 21, 1961
11 Claims. (Cl. 244—12)

The present invention relates to aircraft having two or more jet propulsion units placed symmetrically to the central axis of the aircraft, particularly to power plants of aircraft capable to start and land in vertical direction. The invention relates to aircraft of the aforesaid type and wherein each jet propulsion unit has two thrust nozzles placed at the side of the unit.

One of the most important problems connected with the aforedescribed aircraft is the maintenance of thrust symmetry when starting in vertical direction and when hovering in case one of the power plants fails or has a defect.

In the event of a failure of a jet power unit on one side of the longitudinal axis of the aircraft a nozzle of a jet unit on the other side of the longitudinal center line is connected to a nozzle of the failing unit for maintaining symmetry of vertical thrust. For example, the inside thrust nozzle or nozzles of a power unit, i.e. the nozzle or nozzles placed closest to the fuselage of the aircraft, are connected by a connecting conduit with the inside thrust nozzle or nozzles of the symmetrically opposed power unit. The connecting conduit is provided with control means which, under normal conditions, close the conduit and directly connect each power unit for gas flow with its own thrust nozzle or nozzles. In the event of failure or defect of a jet propulsion unit, gas flow in the failing as well as in the operative jet propulsion unit to the thrust nozzles which are connected by the connecting conduit is blocked. On the other hand a connection between a nozzle of the operative jet propulsion unit and a thrust nozzle of the defective jet propulsion unit is established through the connecting conduit. In this way half of the amount of gas available in the normal-running jet propulsion unit is supplied to the defective jet propulsion unit in order to produce a jet of gas at the thrust nozzle or nozzles of the defective unit.

In an arrangement wherein either the vertical thrust nozzles of opposed jet power units which nozzles are close to the center line of the aircraft or the nozzles which are distant from the center line are connected by a connecting conduit, balance of thrust is essentially maintained upon failure of one power unit. Since, in case the inside nozzles are connected, one outside nozzle of the operative unit and one inside nozzle of the failing unit is in operation, the levers on which the vertical thrusts act are not equal. This causes certain rolling moments which, though not dangerous, must be avoided. It has been proposed to place the nozzles at the sides of each power unit in close vicinity by providing suitable channels between the normal gas outlets of the engines and the nozzles on one side of the engines. A similar effect is obtained if the nozzles of each power unit are arranged at an angle instead of in diametrically opposed position.

The aforesaid placing of the nozzles in order to avoid unequal leverage of the thrusts is not always possible and it is an object of the present invention to provide, in an airplane having jet power engines at each side of the longitudinal axis of the airplane, each engine having at least two vertical thrust producing nozzles placed on the side of the engine, and wherein one nozzle of one power engine can be supplied with gas from the opposite power engine in case of failure of the first engine, means for distributing the gas of the second engine to the nozzles of the first engine in such manner that unequal thrust due to unequal distance of the operated nozzles from the longitudinal center line of the airplane is counterbalanced by a corresponding unequal distribution of the operating gas to the operated nozzles.

The invention is particularly applicable to airplanes having a two-stream jet power unit on either side of the longitudinal center line, each unit having two laterally placed nozzles fed by gas from the relatively cold stream and two laterally placed nozzles fed by gas from the hot stream. The inner nozzles of the units which nozzles are fed with gas from one of the streams are connected by a connecting unit and the outer nozzles of the units which nozzles are fed with gas from the second stream are connected. Upon failure of one of the units one outside nozzle of the operative unit, one inside nozzle of the defective unit, one inside nozzle of the operative unit, and one outside nozzle of the defective unit remain in operation whereby perfect vertical thrust balance is maintained.

The invention also refers to a method of emergency operation of an airplane having jet power engines placed on either side of the fuselage, each engine having a nozzle relatively close to the fuselage and a nozzle relatively far from the fuselage for producing vertical thrust for vertical take-off and landing, the method including the step of diverting such portion of the gas normally discharged by the nozzle of one engine to one nozzle of the opposite engine, when the latter is out of order, as to provide perfectly balanced thrust although gas continues to be discharged through two nozzles of the operative engine.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a schematic elevation of an airplane according to the invention.

FIG. 2 is a schematic plan view of a portion of an airplane according to the invention.

FIG. 3 is a schematic sectional view of the portion of an airplane shown in FIG. 2, the section being made along line III—III of FIG. 2.

FIG. 4 is a schematic plan view of a jet power plant arrangement according to the invention.

FIG. 5 is a schematic elevation of a modified airplane according to the invention.

FIG. 6 is a schematic illustration of a modified power plant according to the invention.

FIG. 7 is an elevation of a further modification of an airplane according to the invention.

FIG. 1 shows jet power units I and II placed symmetrically to a fuselage 11 beneath the wings 12 and 12', respectively. The unit I has laterally placed thrust nozzles 1 and 2 and the unit II has laterally placed thrust nozzles 1' and 2'. These thrust nozzles can be turned so that their jets are directed downward in order to produce lifting power as well as backward for producing thrust for horizontal flight. In the illustrated example the outside thrust nozzles 1 and 1' are connected through a conduit 7. The latter is closed at normal operation by valves 3 and 3' which are in the positions shown in FIG. 1 and the thrust nozzles 1 and 1' are directly connected to the respective propulsion units. The entire thrust is equally distributed to the thrust nozzles 1, 2, 1' and 2'.

In case of a shutdown or failure of the propulsion unit II the direct connection between the propulsion unit II and the corresponding thrust nozzle 1' is blocked and part of the gas normally supplied to the thrust nozzle 1 of the unit I is conducted to the thrust nozzle 1' through the conduit 7. A jet continues to leave the thrust nozzle 2 of the operative unit I, as at normal operation. The distribution of gas to the thrust nozzle 1 of the operative unit and to the thrust nozzle 1' of the defective unit is controlled according to the distances of the thrust nozzles 1, 2 and 1' from the central axis of the aircraft. Disregarding the losses caused by the deviation of the gas stream and friction in the conduit 7 and indicating the distance of the thrust nozzles 1 and 1' from the center line by $L_1$, and the distance of the thrust nozzles 2 and 2' from the center line by $L_2$, the thrust S at the nozzle 1 and S' at the nozzle 1' can be expressed by the following equation:

$$\frac{S}{S'} = \frac{L_1 - L_2}{L_1 + L_2}$$

This shows that the thrust contribution of nozzle 1 of the operative unit I must be the smaller the greater the distance of the unit from the fuselage. In an aircraft having, for example, two engines on each wing at different distances from the center line the distribution of gas between the outer engines must be different from that between the inner engines.

So far only the case of a full shutdown of a power unit and exclusive use of the gas produced by the normally operating opposite unit was considered for maintaining thrust symmetry on both sides of the aircraft. The system according to the invention, however, can also cope with partial failure of a propulsion unit. For example, if the output of a power unit decreases and does not require a full shutdown, the gas flow through the connecting conduit 7 can be so regulated that the total thrust still produced in both propulsion units is equally distributed on both sides of the aircraft and thrust symmetry is maintained. Such an arrangement is particularly advantageous because an equilibrium of moments is maintained at all times and because—after an actual disturbance of equilibrium—equilibrium is not restored shockwise by specific switching operations. This essentially contributes to the stabilization of the aircraft and relieves the responsibility of the pilot.

Upon failure of the engine II the valve 3' is turned counterclockwise until the nozzle 1' is disconnected with respect to gas flow from the engine II. Valve 3 is also turned counterclockwise to divert a portion of the gas normally discharged by the nozzle 1 into the conduit 7 and to the nozzle 1'. The nozzle 2 continues to operate in the normal manner. By suitable adjustment of the valve 3 full balance between the thrusts produced by the engine I and the engine II can be obtained. If, for example, the distance $L_1$ is 3 and the distance $L_2$ is 2, the the moment produced by nozzle 1 is $S \times 3$ and that produced by nozzle 3' is $S' \times 3$. The moment produced by nozzle 2 is $S_2 \times 2$. In order to obtain equilibrium $S \times 3 + S_2 \times 2$ must be equal to $S' \times 3$. $S_2$ is equal to $S + S'$. If the ratio $S:S'$ equals $(3-2):(3+2)$, S' is equal to 5S and the formula $3S + 2S_2 = 3S'$ can be written as $$3S + 2(S + S') = 3S'$$

and the latter formula to $3/5S' + 2/5S' + 2S' = 3S'$, i.e., the sum of the moments on the left side is $3S'$ which is equal to the moment $3S'$ on the right side.

In the example illustrated in FIG. 1 the conduit 7 is inside the wings 12 and 12'. If the conduit is placed in the nose of the wing and if the nose is constructed as a pressure box, this arrangement can also be used for de-icing. By extending the conduit 7 up to the end of the wings and providing steering nozzles 10 and 10' thereat the gas can also be used for steering the hovering airplane and no other means for jet steering need be provided. If desired, the conduit 7 can also be used for influencing the boundary layer. If the conduit 7 is used for de-icing, steering and influencing the boundary layer, the conduit 7 must be connected for gas flow with both propulsion units I and II, also at normal operation.

An improvement of the steering effect can be achieved by an arrangement as shown in FIGS. 2 and 3 for one side of the airplane. A turbine 13 is connected to each end of the conduit 7 and placed inside the wings 12 and 12'. Each turbine drives a blower 14 of the diametric flow type and built into a wing. This arrangement may be used solely or in combination with a conventional jet steering apparatus. The arrangement can also be used for influencing the boundary layer.

FIG. 4 diagrammatically shows the application of the invention to airplanes having two-stream jet power units symmetrically arranged with respect to the longitudinal axis of the airplane. The nozzles 1 and 2 of the unit I and the nozzles 1' and 2' of the unit II are supplied with one of the gas streams produced in the respective units and the nozzels 4 and 5 of unit I and 4' and 5' of unit II are supplied with the second gas stream produced in the respective units. In the example illustrated in FIG. 4 the inside nozzles 2 and 2' for one of the gas streams are connected by a conduit 6 and the outside nozzles 4 and 4' for the second gas stream are connected by a conduit 8 for supplying the nozzles of a failing unit with gas from the operative unit. Valves or gas flow diverting means 3, 3' are provided at the ends of the conduit 6 and valves 23, 23' are provided at the ends of the conduit 8.

Assuming that the thrusts producible by each of the gas streams in each unit are approximately equal, full thrust symmetry can be maintained if one of the units becomes inoperative. If the unit II fails, gas of the first stream of the unit I is discharged at substantially equal rates through the nozzle 1 and through the nozzle 2' which receives the gas through the conduit 6. Similarly, the nozzles 5 and 4' are supplied with gas of the second stream produced in the unit I. The valves 3 and 23 partly or fully stop gas flow to the nozzles 2 and 4, respectivley, and the valves 3' and 23' disconnect the nozzles 2' and 4' for gas flow from the unit II. Since the distances of the operating nozzles 1 and 4' from the longitudinal axis of the airplane are equal and the distances of the operating nozzles 5 and 2' from the longitudinal axis of the airplane are also equal, full equilibrium is obtained. Whereas during normal operation eight nozzles produce equal thrust, only four symmetrically placed nozzles are operative if one unit fails and only one half of the normal thrust is available.

FIGS. 5 and 6 schematically illustrate a modification of the system shown in FIG. 4. The gas of the second stream is discharged through the nozzles 4, 5 and 4', 5' independently of the gas of the first stream which is normally discharged through the nozzles 1, 2 and 1', 2'. For providing balanced thrust upon failure of one of the units I or II the inside nozzles 2 and 2' are connected by a conduit 6 as in the system shown in FIG. 4. The outside nozzles 1 and 1' are connected by a conduit 7'. At the ends of the conduit 6 valves or gas flow diverting means 3 and 3' are provided as in FIG. 4. At the ends of the conduit 7' valves 33 and 33' are provided. Assuming that the unit II is out of order the second gas stream produced in the unit I continues to be discharged through the nozzles 4 and 5. The nozzles 1 and 2 normally discharging the gas of the first stream, however, are disconnected for gas flow from the unit I and the entire first stream of unit I is conducted through the conduits 6 and 7' to the nozzles 2' and 1', respectively, which are separated for gas flow from the unit II by the valves 3' and 33'. In the described and illustrated position of the valves, complete vertical thrust balance is obtained.

The nozzles 1, 2, 1' and 2' are preferably supplied with the relativelv cold gas stream, i.e. with compressed air, whereas the nozzles 4, 5, 4' and 5' are supplied with hot combustion gas. In this case only relatively cold gas is conducted through the conduits 6 and 7' and hot gas need not be conducted through valved conduits.

As shown in FIG. 5, the units or engines I and II are arranged close to the fuselage 11 and below the wings 12 and 12'. The units are so placed that the diametrically opposed nozzles of each unit are at different elevations. The connecting conduits 6 and 7' are so located as to cause as little air and flow resistance as possible. The valves 3, 3', 33 and 33' are shown in the positions in which they are when both units operate normally.

FIG. 7 shows an arrangement of the type shown in FIG. 5 wherein, however, the conduit 6 is omitted and the nozzles 2 and 2' are connected by conduits 9 and 9' to the conduit 7' so that there is a common conduit for connecting the nozzles 1 and 1' and the nozzles 2 and 2'.

The valves or gas flow diverting means used in the described and illustrated systems according to the invention are conventional and not shown in detail. Depending on the desired mode of operation valves are used which permit eitehr full flow or no flow, or valves are used which can be gradually opened and closed.

I claim:

1. Method of emergency operation of an airplane having a fuselage, at least two gas jet power engines placed symmetrically with respect to the longitudinal center line of the airplane, each engine having a vertical thrust producing inside nozzle relatively close to the fuselage and a vertical thrust producing outside nozzle relatively far from the fuselage, and a conduit connecting one nozzle of one engine with the nozzle of the second engine placed at the same distance from the fuselage as the first nozzle, the method including diverting, upon failure of one engine, gas from one nozzle of the operative engine and supplying the diverted gas to the nozzle of the failing opposite engine which nozzle has the same distance from the fuselage as the nozzle of the operative engine from which nozzle gas is diverted, and maintaining the ratio between the rates of gas continuing to flow through the nozzle wherefrom gas is diverted and the gas diverted to the nozzle of the failing engine equal to the ratio between the difference between and the sum of the distances of the nozzles of one of the engines from the center line of the airplane.

2. An airplane comprising a fuselage, at least two gas jet power engines placed symmetrically with respect to the longitudinal center line of the airplane, each engine having a vertical thrust producing inside nozzle relatively close to the fuselage and a vertical thrust producing outside nozzle relatively far from the fuselage, a conduit connecting one nozzle of one engine with the nozzle of the second engine placed at the same distance from the fuselage as the first nozzle, and gas flow control means interposed in said conduit for diverting a controlled amount of gas from the connected nozzle of one engine to the connected nozzle of the opposite engine, upon failure of said opposite engine, the ratio of the rate of gas flow through the connected thrust nozzle of the first engine and the rate of gas flow to the connected nozzle of the second engine being predetermined according to the ratio between the difference between the distance of the inside nozzle and the distance of the outside nozzle from the longitudinal center line of the airplane and the sum of said distances.

3. An airplane as defined in claim 2 wherein said control means includes valves operatively connected to said conduit and said nozzles connected thereto and operable to continuously increase the flow area to said conduit and simultaneously decrease the flow area to the respective nozzle and conversely.

4. An airplane comprising a fuselage, wings connected to said fuselage, at least two gas jet power engines placed symmetrically with respect to the longitudinal center line of the airplane, each engine having a vertical thrust producing inside nozzle relatively close to the fuselage and a vertical thrust producing outside nozzle relatively far from the fuselage, a conduit connecting one nozzle of one engine with the nozzle of the second engine placed at the same distance from the fuselage as the first nozzle, and gas flow control means interposed in said conduit for diverting a controlled amount of gas from the connected nozzle of one engine to the connected nozzle of the opposite engine, upon failure of said opposite engine, said conduit being placed in the nose of said wings.

5. An airplane comprising a fuselage, wings connected to said fuselage, means placed in said wings for influencing the boundary layer, at least two gas jet power engines placed symmetrically with respect to the longitudinal center line of the airplane, each engine having a vertical thrust producing inside nozzle relatively close to the fuselage and a vertical thrust producing outside nozzle relatively far from the fuselage, a conduit connecting one nozzle of one engine with the nozzle of the second engine placed at the same distance from the fuselage as the first nozzle, and gas flow control means interposed in said conduit for diverting a controlled amount of gas from the connected nozzle of one engine to the connected nozzle of the opposite engine, upon failure of said opposite engine, said means for influencing the boundary layer being connected to said conduit for receiving gas therefrom.

6. An airplane comprising a fuselage, wings connected to said fuselage, means placed in said wings for steering the airplane during periods of hovering by gas jets discharged by said steering means, at least two gas jet power engines placed symmetrically with respect to the longitudinal center line of the airplane, each engine having a vertical thrust producing inside nozzle relatively close to the fuselage and a vertical thrust producing outside nozzle relatively far from the fuselage, a conduit connecting one nozzle of one engine with the nozzle of the second engine placed at the same distance from the fuselage as the first nozzle, and gas flow control means interposed in said conduit for diverting a controlled amount of gas from the connected nozzle of one engine to the connected nozzle of the opposite engine, upon failure of said opposite engine, said steering means being connected to said conduit for receiving gas therefrom.

7. An airplane as defined in claim 6 wherein said steering means includes turbines and blowers driven thereby, said turbines being connected to said conduit for receiving operating gas therefrom.

8. An airplane comprising a fuselage, at least two gas jet power engines of the two-stream type placed symmetrically with respect to the longitudinal axis of the airplane, each engine producing a relatively cold gas stream and a separate stream of hot gas, each engine having a pair of vertical thrust producing nozzles operable to discharge the relatively cold gas stream and a pair of vertical thrust producing nozzles operable to discharge the hot gas, each pair having an inside nozzle relatively close to said fuselage and an outside nozzle relatively far from the fuselage, conduit means connecting an inside nozzle of one engine with an inside nozzle of the opposite engine and connecting an outside nozzle of one engine with an outside nozzle of the opposite engine, and gas flow control means operatively connected to said conduit means for diverting gas from the nozzles of one of said engines, which nozzles are connected to said conduit means, to the nozzles of the opposite engine which nozzles are connected to said conduit means, upon failure of said opposite engine.

9. An airplane as defined in claim 8 wherein said conduit means includes a conduit connected for gas flow to nozzles operable to discharge gas from the relatively cold gas streams produced in said engines and a conduit connected for gas flow to nozzles operable to discharge hot gas produced in said engines.

10. An airplane as defined in claim 8 wherein said conduit means is operatively connected for gas flow to nozzles of said engines which nozzles are operable to discharge gas from like gas streams produced in said engines.

11. An airplane according to claim 10 wherein said conduit means includes a single conduit connected for gas flow to an inside nozzle and to an outside nozzle of one engine and to an inside nozzle and to an outside nozzle of the opposite engine.

References Cited in the file of this patent

UNITED STATES PATENTS

| | | |
|---|---|---|
| 2,427,972 | Melchior | Sept. 23, 1947 |
| 2,954,944 | Huet | Oct. 4, 1960 |

FOREIGN PATENTS

| | | |
|---|---|---|
| 1,040,907 | Germany | Oct. 9, 1958 |
| 226,135 | Australia | Dec. 23, 1959 |

OTHER REFERENCES

"Convertible Turbojet Engines for VTOL Aircraft," IAS Report 59–60, Jan. 29, 1959.